United States Patent
Lunk et al.

(10) Patent No.: US 6,478,845 B1
(45) Date of Patent: Nov. 12, 2002

(54) BORON ADDITION FOR MAKING POTASSIUM-DOPED TUNGSTEN

(75) Inventors: Hans-Joachim Lunk, Towanda, PA (US); Michael Salmen, Hiltenfingen (DE); Anna S. Nached, Sayre, PA (US); Maria B. Winnicka, Sayre, PA (US); Henry J. Stevens, Athens, PA (US)

(73) Assignee: Osram Sylvania Inc., Danvers, MA (US)

( * ) Notice: Subject to any disclaimer, the term of this patent is extended or adjusted under 35 U.S.C. 154(b) by 0 days.

(21) Appl. No.: 09/902,353

(22) Filed: Jul. 9, 2001

(51) Int. Cl.[7] .................................................. B22F 9/24
(52) U.S. Cl. .......................... 75/362; 75/363; 75/369; 419/34
(58) Field of Search ................. 75/362, 363, 365, 75/369; 419/34

(56) References Cited

U.S. PATENT DOCUMENTS

| | | | | |
|---|---|---|---|---|
| 3,723,076 A | * | 3/1973 | Benesovsky | 419/25 |
| 3,773,493 A | * | 11/1973 | Brecher et al. | 75/344 |
| 4,123,833 A | * | 11/1978 | Choyke et al. | 445/48 |
| 5,051,139 A | * | 9/1991 | Eck | 148/673 |
| 5,785,731 A | | 7/1998 | Fait et al. | 75/368 |
| 5,795,366 A | | 8/1998 | Salmen et al. | 75/368 |
| 6,129,890 A | | 10/2000 | Lunk et al. | 419/4 |
| 6,165,412 A | | 12/2000 | Lunk et al. | 419/4 |

* cited by examiner

*Primary Examiner*—George Wyszomierski
(74) *Attorney, Agent, or Firm*—Robert F. Clark

(57) ABSTRACT

A boron addition for making potassium-doped tungsten powder is described herein. Boron is added to a potassium-doped starting material, preferably in the form of boric acid, and then the mixture is reduced to form a potassium-doped tungsten powder. The boron addition results in increased potassium incorporation in the potassium-doped tungsten powder and also effects an increase in potassium retention in sintered compacts of the potassium-doped tungsten powder.

32 Claims, 1 Drawing Sheet

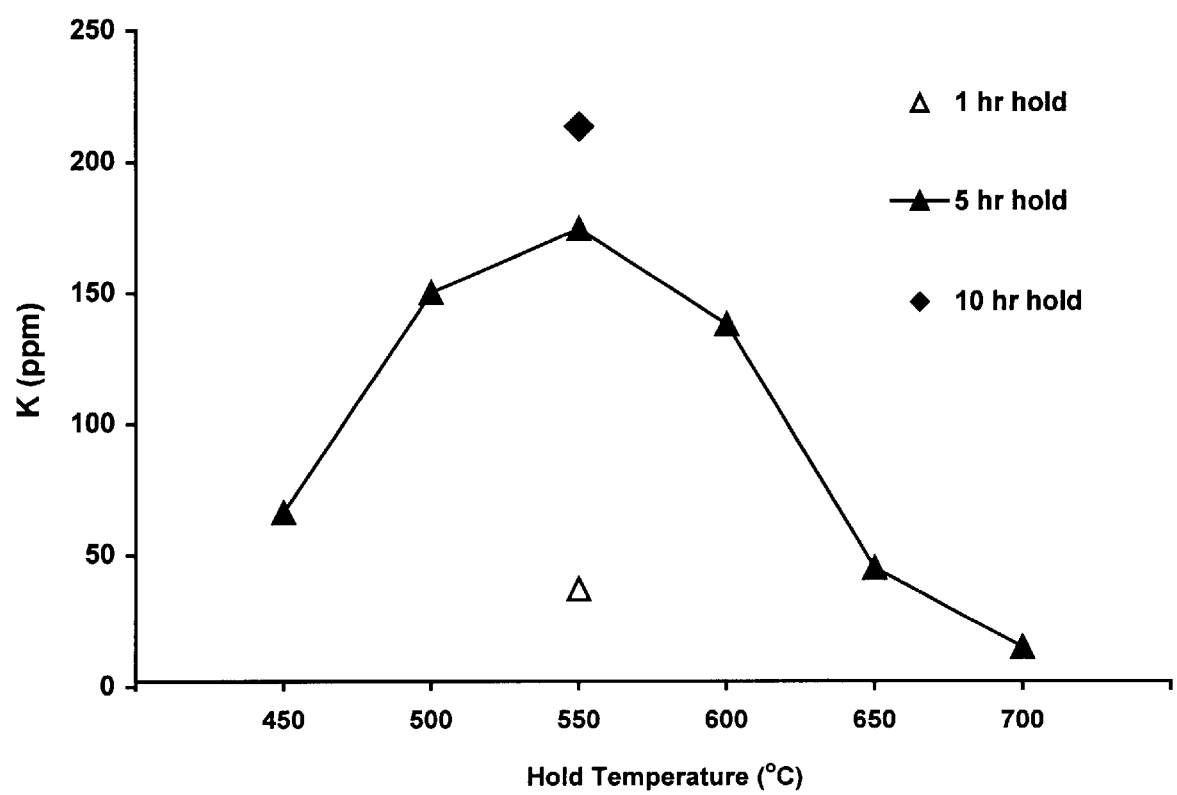

US 6,478,845 B1

BORON ADDITION FOR MAKING POTASSIUM-DOPED TUNGSTEN

TECHNICAL FIELD

This invention relates to methods of making tungsten metal powders containing a potassium dopant. More particularly, this invention relates to non-sag tungsten wire for incandescent lamp filaments.

BACKGROUND OF THE INVENTION

Tungsten wire used in the coiled filaments of incandescent lamps is subject to high mechanical loading and stresses especially in lamps in which the filament operates at temperatures upwards of about 3000° C. Pure tungsten wire is not suitable to make filaments for incandescent lamps because under typical operating conditions the individual grains of the filament have a tendency to offset, or slide off (creep or sag) with respect to each other. This causes the filament to sag and short out. A lamp made with pure tungsten filaments will, therefore, fail prematurely.

The beneficial effects of doping to improve the creep resistance of tungsten wire were recognized as early as 1910. In particular, the creep resistance of tungsten wire is known to be improved by doping tungsten blue oxide with potassium-containing compounds to make so-called non-sag (NS) tungsten wire. NS tungsten wire is unique in that it is a microalloy of two very diverse metals, tungsten and potassium. Its creep resistance is due to a minute concentration of potassium of about 75 ppm distributed in the tungsten wire as longitudinal rows of liquid and/or gaseous bubbles. Silicon and aluminum are added with the potassium to serve exclusively as 'helpers' during the reduction and sintering stages. After high-temperature sintering the concentration of Si and Al is reduced to less than 10 ppm each. Neither Si nor Al is known to have any positive role in the final NS tungsten wire.

The long chain of processes in the standard powder metallurgical (P/M) manufacturing of potassium-doped tungsten for incandescent lamps starts with the partial reduction of ammonium paratungstate tetrahydrate (APT), $(NH_4)_{10}[H_2W_{12}O_{42}] \cdot 4H_2O$, in hydrogen, hydrogen/nitrogen or an inert atmosphere, to produce a tungsten blue oxide (TBO), $xNH_3 \cdot yH_2O \cdot WO_n$, where $0<x<0.2$, $0<y<0.2$, and $2.5<n<3.0$. The TBO is then doped with aqueous solutions 1? containing potassium, silicon and aluminum to a total concentration of about 5000 ppm. The doped TBO is then reduced W with hydrogen to doped tungsten powder. The K, Al, Si-doped tungsten powder, in turn, is washed with hydrofluoric acid, dried, pressed, sintered, rolled or swaged, and drawn. The drawing process can work down the NS tungsten wire to diameters of about 15 μm for use in coiled filaments. The multi-step process finally leads to the outstanding high-temperature creep resistance of NS tungsten wire.

The production of K, Al, Si-doped tungsten powder according to older prior art methods tends to be very inefficient because of the number of steps involved. These processes further produce a contaminated acid waste which must be properly disposed of. More recent methods have made the production of non-sag tungsten wire more efficient by using fewer processing steps and reducing acid waste. For example, U.S. Pat. No. 5,785,731 to Fait et al., which is incorporated herein by reference, discloses a method of making potassium-doped tungsten powder in a one-step reduction of mixed crystals of ammonium potassium paratungstate (AKPT), $(NH_4)_{10-x}K_x[H_2W_{12}O_{42}] \cdot 4H_2O$ ($x=0.04$–0.4). This method works without doping with Al or Si, and without acid washing. However, two problems remain. First, it is difficult to realize potassium contents higher than 80 ppm and achieve densities of at least 17.2 g/cm$^3$ in sintered tungsten ingots. And second, the method does not prevent or at least remarkably diminish the loss of potassium during reduction of the AKPT.

Another recent method is described in U.S. Pat. No. 6,165,412 to Lunk et al., which is incorporated herein by reference. In that method, a thermally unstable potassium-containing salt or a potassium tungstate is combined with ammonium paratungstate or ammonium metatungstate and then reduced in a single step to form a potassium-doped tungsten powder. Although the single-step reduction offers several advantages, a significant amount of potassium is still lost during reduction.

SUMMARY OF THE INVENTION

It is an object of the invention to obviate the disadvantages of the prior art.

It is another object of the invention to provide a method for increasing potassium incorporation in a potassium-doped tungsten powder.

In accordance with an object of the invention, there is provided a method for making a potassium-doped tungsten powder comprising forming a mixture of a tungsten-containing compound, a potassium dopant, and a boron-containing compound; and reducing the mixture to form a potassium-doped tungsten powder.

In another aspect of the invention, there is provided a method for making a potassium-doped tungsten powder comprising forming a mixture of boric acid and ammonium potassium paratungstate, the mixture having a molar ratio of boron to potassium from about 0.6:1 to about 3:1; and reducing the mixture to form a potassium-doped tungsten powder.

In yet another aspect of the invention, there is provided a method for making a potassium-doped tungsten powder comprising forming a mixture of boric acid, a potassium dopant, and a tungsten-containing compound, the potassium dopant being selected from a thermally unstable potassium-containing salt or a potassium tungstate, the tungsten-containing compound being selected from ammonium paratungstate, ammonium metatungstate, or a tungsten oxide, the mixture having a molar ratio of boron to potassium from about 0.6:1 to about 3:1. The mixture is then reduced to form a potassium-doped tungsten powder.

BRIEF DESCRIPTION OF THE DRAWING

The FIGURE shows the relationship between the hold temperature and the hold time on the potassium incorporation in an HF-washed, potassium-doped tungsten powder made by the method of this invention.

DESCRIPTION OF THE PREFERRED EMBODIMENTS

For a better understanding of the present invention, together with other and further objects, advantages and capabilities thereof, reference is made to the following disclosure and appended claims taken in conjunction with the above-described drawing.

The addition of a boron-containing compound, preferably boric acid (B(OH)$_3$), during the initial steps of making a potassium-doped tungsten powder has been found to decrease the evaporation of potassium during the reduction of the potassium-containing starting material. In particular, the potassium loss from the potassium-containing starting material may be reduced from about 80% without the boron addition to only about 10% when boron is added. It is believed that the formation of nonvolatile potassium borates such as $K_2B_2O_4$, $K_2B_4O_7$ and $KB_5O_8$ during the reduction step contributes significantly to the decrease in potassium loss. Additionally, the amount of potassium retained after sintering compacts of the potassium-doped powder made with boron addition may be more than twice the amount of potassium retained in sintered compacts made without boron.

The boron addition may be accomplished by wet or dry doping a potassium-containing starting material. The potassium-containing starting material is comprised of a potassium dopant and a tungsten-containing compound which is capable of being reduced to tungsten metal. The potassium dopant may be contained within the tungsten-containing compound such as in the case of ammonium potassium paratungstate (AKPT), $(NH_4)_{10-x}K_x[H_2W_{12}O_{42}]\cdot 4H_2O$ (x=0.04–0.4), or partially reduced AKPT (potassium-doped TBO(K)), or the potassium dopant may be combined separately with a tungsten-containing compound. In the latter case, the preferred tungsten-containing compounds are ammonium paratungstate (APT), $(NH_4)_{10}[H_2W_{12}O_{42}]\cdot 4H_2O$, ammonium metatungstate (AMT), $(NH_4)_6[H_2W_{12}O_{40}]\cdot\sim 5H_2O$, and tungsten oxides such as TBO. The potassium dopant preferably comprises potassium nitrate, $KNO_3$, or potassium nitrite, $KNO_2$. Other useful potassium dopants may include other thermally unstable potassium-containing salts such as potassium carbonate, $K_2CO_3$, and potassium hydrogen carbonate, $KHCO_3$, or any one of a number of different potassium tungstates, $K_2W_nO_{3n+1}$ (n=1 to 8). As with the method of boron addition, the method of potassium doping may be accomplished by conventional wet or dry doping methods. Preferably, the concentration of the potassium dopant in the mixture is from about 500 ppm to about 2000 ppm based on the amount of tungsten. The order of combining the starting materials does not appear to be critical.

Preferred methods for boron addition with boric acid include the dry doping of AKPT, the dry or wet doping of potassium-doped TBO(K), and the dry doping of APT/$KNO_3$. Preferably, the reduction temperature and hold times range from about 500° C. to about 600° C. for about 5 hours to about 10 hours. More preferably, the reduction temperature is about 550° C. A final temperature hold for about 1 hour is conducted at about 900° C. The higher temperature is used to complete the reduction to metal powder. A temperature lower than 900° C. is possible but the reduction time will be increased. For example, a reduction at 650° C. under similar conditions requires about 15 hours. Therefore, preferably, the final temperature hold may range from about 650° C. to about 900° C. and the final hold time may range from about 1 hour to about 15 hours.

In addition to the increased potassium incorporation during reduction, the method of this invention enables the production of sintered tungsten compacts with potassium contents up to 135 ppm and densities in the range of 16.5 to 18.1 g/cm³. The amount of potassium retained after sintering is about the same whether doped tungsten powder is sintered as-reduced or is water or acid washed prior to sintering. Preferably, the boron content of the boron-doped starting material is from about 500 ppm to about 6500 ppm based on the tungsten content. The residual boron content of the sintered compact generally is less than 15 ppm. A preferred range for the molar ratio of boron to potassium in the boron-doped starting material is about 0.6:1 to about 3:1. An amount of 120 ppm K in the sintered compact is reached with a molar ratio of boron to potassium of 0.6:1. An amount of 135 ppm K in the sintered compact is reached with a corresponding molar ratio of 3:1.

The following non-limiting examples are illustrative of the method of this invention.

EXAMPLE 1

Dry Doping of AKPT With Boric Acid

Table 1 compares the effect of the boron addition on the potassium retention of AKPT containing 800 ppm K based on the tungsten content. All four samples were reduced in a tube furnace under the same conditions in dry hydrogen—a heating rate of 6K/min, a 5-hour hold at 550° C., and a final 1-hour hold at 900° C. Sintered compacts were made from as-reduced, water-washed, and HF-washed powder. The HF-washed powder was made by washing the as-reduced powder first with water, then with hydrofluoric acid and finally thoroughly with water. The 9-gram sintered compacts were formed by mechanical pressing and indirect sintering in 20-cfh dry hydrogen at 1800° C. for 6 hours using a temperature ramp of 20K/min. The analysis of the resulting powders and compacts is presented in Table 1.

TABLE 1

| Starting Sample | | Potassium | | | | | | Boron | Mercury Density | | |
|---|---|---|---|---|---|---|---|---|---|---|---|
| 300 g AKPT | | (ppm) | | | | | | | (g/cm³) | | |
| (800 ppm K) + B(OH)₃ (mg) | Molar Ratio (B:K) | Unwashed Powder | Sintered Compact | Water-washed Powder | Sintered Compact | HF-washed Powder | Sintered Compact | (ppm) Sintered Compact | 'Unwashed' Compact | 'Water-washed' Compact | 'HF-washed' Compact |
| 0 | 0 | 165 | 65 | 95 | 65 | — | — | 0 | 18.2 | 18.3 | — |
| 750 | 0.6:1 | 279 | 119 | 166 | 121 | 153 | 122 | 1 | 17.2 | 16.8 | 17.1 |
| 3700 | 3.0:1 | 699 | 139 | 187 | 133 | 190 | 132 | 11 | 17.4 | 17.9 | 18.1 |
| 6200 | 5.0:1 | 797 | 105 | 136 | 97 | 136 | 94 | 14 | 17.1 | 17.7 | 18.0 |

These results show that the potassium levels of the tungsten powders made from the boron-doped starting material are significantly higher than the tungsten powder made without the boron addition. The potassium incorporation rates of the potassium-doped tungsten powders relative to the starting materials is given in Table 2. The potassium content of the sintered compacts made with the boron addition is from about 1.5 to about 2.1 times greater than the compacts made without the boron addition. The potassium retention rates of the sintered compacts relative to the powders from which they were made are given in Table 3. The observed potassium retention rates of about 70% in the sintered compacts is in the same range as for conventional K, Al, Si-doped tungsten powders. However, as described above, the potassium contents of the compacts made by the method of this invention are much higher than the compact made without the boron addition.

TABLE 2

| Starting Sample | | Potassium Incorporation After Reduction | | |
|---|---|---|---|---|
| 300 g AKPT (800 ppm K) + B(OH)₃ (mg) | Molar Ratio (B:K) | Unwashed Powder | Water-washed Powder | HF-washed Powder |
| 0 | 0 | 21% | 12% | — |
| 750 | 0.6:1 | 35% | 21% | 19% |
| 3700 | 3.0:1 | 87% | 23% | 24% |
| 6200 | 5.0:1 | 100% | 17% | 17% |

TABLE 3

| Starting Sample | | Potassium Retention Rate After Sintering (vs. K-doped W powder) | | |
|---|---|---|---|---|
| 300 g AKPT (800 ppm K) + B(OH)₃ (mg) | Molar Ratio (B:K) | Sintered Compact (Unwashed Powder) | Sintered Compact (Water-washed Powder) | Sintered Compact (HF-washed Powder) |
| 0 | 0 | 39% | 68% | — |
| 750 | 0.6:1 | 43% | 73% | 80% |
| 3700 | 3.0:1 | 20% | 71% | 69% |
| 6200 | 5.0:1 | 13% | 71% | 69% |

EXAMPLE 2

Dry Doping of TBO With Potassium Nitrate and Boric Acid A)

TBO(Type 1) Composition ~$WO_{2.8}$

A 1-kg amount of tungsten powder doped with potassium and boron was made by reducing 267-g portions of TBO (Type 1)/KNO₃/B(OH)₃ blends (1500 ppm K and 1245 ppm B (based on W), molar ratio of boron to potassium 3:1). The starting material was reduced in dry hydrogen using a temperature ramp of 6K/min, a 10-hour hold at 550° C., and a final 1-hour hold at 900° C. The combined, homogenized and water-washed tungsten powders contained 179 ppm K and 77 ppm B. The fine powder had an FSSS particle size of 1.5 μm.

Two isostatically pressed billets, 250 g (47 ksi, ~1" dia., 1¾" long) and 500 g (48 ksi, ~1" dia., 3½" long), respectively, were placed uprightly on one end in a molybdenum-lined molybdenum boat and indirectly sintered in 20-cfh dry hydrogen at 1800° C. for 6 hours. An ink absorption test revealed a sealed surface for both sintered billets. The analysis of the sintered billets is given in Table 4.

TABLE 4

| Billet Sintering regime | | Density (g/cm³) | K (ppm) | K Retention Rate | B (ppm) |
|---|---|---|---|---|---|
| 250 g Ramp: | 50 K/min to 1200° C., 30 K/min to 1500° C., 20 K/min to 1800° C., (6-hour hold at 1800° C.) | 17.87 | 74 | 41% | 7 |
| 500 g Ramp: | 20 K/min to 1800° C. (6-hour hold at 1800° C.) | 17.27 | 94 | 53% | 10 |

B) TBO(Type 2) Composition ~$WO_{2.95}$

The reduction of dry blends of TBO(Type 2)/KNO₃/B(OH)₃ (1500 ppm K and 1245 ppm B (based on W), molar ratio of boron to potassium of 3:1) in dry hydrogen led to higher potassium incorporation rates than the use of TBO (Type 1). The figure shows the relationship between the hold temperature and the hold time on potassium retention in the HF-washed, potassium-doped tungsten powder. A 5-hour hold at 550° C. gave a high potassium content of 174 ppm in the HF-washed powder. A 10-hour hold at 550° C. resulted in a very high value of 213 ppm K.

EXAMPLE 3

Wet Doping of TBO with Potassium Nitrate and Boric Acid

A 15-kg quantity of TBO (Type 1) was doped in a laboratory V-blender using a two-step doping procedure. A solution of 46.8 g of KNO₃ in 300 ml of water was added first followed by a solution of 85.8 g of B(OH)₃ in 700 ml of water. The second solution was heated to about 70° C. because of the relatively low solubility of B(OH)₃ in water at room temperature. Both solution quantities were added in small portions followed by mixing. This was repeated until the entire solution volume was added. The doped material was dried in an oven at about 80° C., sifted through 100 mesh (1.5% residue) and homogenized in a V-blender. The resulting doped TBO powder contained 1500 ppm K and 1244 ppm B (based on W). The molar ratio of boron to potassium was 3:1. The powder was reduced in dry hydrogen. An amount of the as-reduced powder was washed with 6% HF. An analysis of the powder is given in Table 5.

TABLE 5

| | As-reduced powder | | HF-washed powder | |
|---|---|---|---|---|
| Reduction regime | K (ppm) | B (ppm) | K (ppm) | B (ppm) |
| Straight 6K/min; 1-hour hold 900° C. | 905 | 672 | 61 | 29 |
| Ramp at 6K/min; 2-hour hold at 550° C.; 1-hour hold at 900° C. | 1195 | 865 | 169 | 71 |

While there has been shown and described what are at the present considered the preferred embodiments of the invention, it will be obvious to those skilled in the art that various changes and modifications may be made therein without departing from the scope of the invention as defined by the appended claims.

We claim:

1. A method for making a potassium-doped tungsten powder comprising:
    forming a mixture of a tungsten-containing compound, a potassium dopant, and a boron-containing compound; and
    reducing the mixture to form a potassium-doped tungsten powder.

2. The method of claim 1 wherein the potassium dopant is contained within the tungsten-containing compound.

3. The method of claim 2 wherein the tungsten-containing compound is ammonium potassium paratungstate or partially reduced ammonium potassium paratungstate.

4. The method of claim 1 wherein the tungsten compound is selected from ammonium paratungstate, ammonium metatungstate, or a tungsten oxide and the potassium dopant is a thermally unstable potassium-containing salt or a potassium tungstate.

5. The method of claim 4 wherein the potassium dopant is potassium nitrate.

6. The method of claim 1 wherein the boron-containing compound is boric acid.

7. The method of claim 6 wherein the mixture is reduced at a temperature from about 500° C. to about 600° C.

8. The method of claim 7 wherein the mixture is further reduced at a second temperature of about 900° C.

9. The method of claim 6 wherein the mixture is reduced at a first temperature from about 500° C. to about 600° C. for about 5 hours to about 10 hours and a second temperature from about 650° C. to about 900° C. for about 1 hour to about 15 hours.

10. The method of claim 6 wherein the tungsten-containing compound is ammonium potassium paratungstate.

11. The method of claim 10 wherein the mixture is reduced at about 550° C.

12. The method of claim 6 wherein the tungsten-containing compound is ammonium paratungstate, ammonium metatungstate, or a tungsten oxide and the potassium dopant is a thermally unstable potassium-containing salt or a potassium tungstate.

13. The method of claim 12 wherein the potassium dopant is potassium nitrate.

14. The method of claim 13 wherein the mixture is reduced at about 550° C.

15. The method of claim 6 wherein the boric acid is added in an aqueous solution.

16. The method of claim 1 wherein the molar ratio of boron to potassium is from about 0.6:1 to about 3:1.

17. The method of claim 1 wherein the concentration of the potassium dopant in the mixture is from about 500 ppm to about 2000 ppm based on the amount of tungsten.

18. The method of claim 1 wherein the boron content of the mixture is from about 500 ppm to about 6500 ppm based on the amount of tungsten.

19. A method for making a potassium-doped tungsten powder comprising:
    forming a mixture of boric acid and ammonium potassium paratungstate, the mixture having a molar ratio of boron to potassium from about 0.6:1 to about 3:1; and
    reducing the mixture to form a potassium-doped tungsten powder.

20. The method of claim 19 wherein the mixture is reduced at a temperature from about 500° C. to about 600° C.

21. The method of claim 20 wherein the mixture is reduced at a temperature of about 550° C.

22. The method of claim 20 wherein the mixture is further reduced at a temperature from about 650° C. to about 900° C. for about 1 hour to about 15 hours.

23. The method of claim 20 wherein the mixture is reduced for about 5 hours to about 10 hours.

24. The method of claim 23 wherein the mixture is reduced at about 550° C.

25. The method of claim 24 wherein the mixture is further reduced at about 900° C. for about 1 hour.

26. A method for making a potassium-doped tungsten powder comprising:
    forming a mixture of boric acid, a potassium dopant, and a tungsten-containing compound, the potassium dopant being selected from a thermally unstable potassium-containing salt or a potassium tungstate, the tungsten-containing compound being selected from ammonium paratungstate, ammonium metatungstate, or a tungsten oxide, the mixture having a molar ratio of boron to potassium from about 0.6:1 to about 3:1; and
    reducing the mixture to form a potassium-doped tungsten powder.

27. The method of claim 26 wherein the mixture is reduced at a temperature from about 500° C. to about 600° C.

28. The method of claim 27 wherein the mixture is reduced at a temperature of about 550° C.

29. The method of claim 27 wherein the mixture is further reduced at a temperature from about 650° C. to about 900° C. for about 1 hour to about 15 hours.

30. The method of claim 27 wherein the mixture is reduced for about 5 hours to about 10 hours.

31. The method of claim 30 wherein the mixture is reduced at about 550° C.

32. The method of claim 31 wherein the mixture is further reduced at about 900° C. for about 1 hour.

* * * * *